(No Model.)

F. K. WARD.
SEAL STOPPER FOR MILK PRESERVING JARS.

No. 441,993. Patented Dec. 2, 1890.

Witnesses

Inventor
Frank K. Ward
By his Attorney

UNITED STATES PATENT OFFICE.

FRANK K. WARD, OF WASHINGTON, DISTRICT OF COLUMBIA.

SEAL-STOPPER FOR MILK-PRESERVING JARS.

SPECIFICATION forming part of Letters Patent No. 441,993, dated December 2, 1890.

Application filed October 21, 1890. Serial No. 368,878. (No model.)

*To all whom it may concern:*

Be it known that I, FRANK K. WARD, a citizen of the United States, residing at Washington city, District of Columbia, have invented certain new and useful Improvements in Milk-Preserving Jars and Sealed Stopples for the Same; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention has relation to certain new and useful improvements in a hermetically-sealed jar or vessel for containing, preserving, and transporting milk and cream, for which Letters Patent No. 437,952 were issued to me October 7, 1890; and the novelty consists in the construction of the stopple thereof, as will be hereinafter more fully described, and particularly specified in the claim.

In the accompanying drawings, forming part of this specification, the same letters of reference indicate similar parts of the invention.

A represents the jar proper, and its construction is identical with my former patent, (to which reference may be had for a fuller description,) the only change being that the inner walls of the jar where they join the bottom, are rounded, so as to dispense with the angles, which might retain the residuum and add extra time and labor to the cleaning of the jar.

Figure 1:
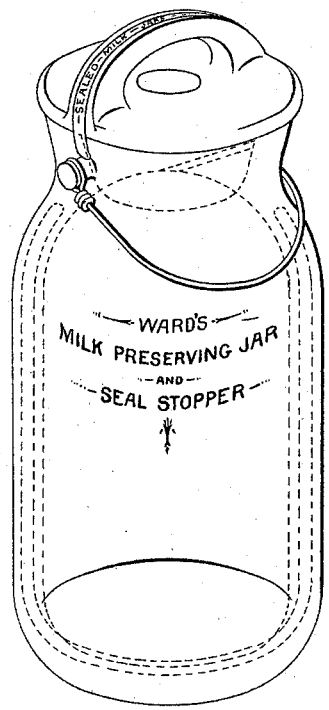
Figure 2:
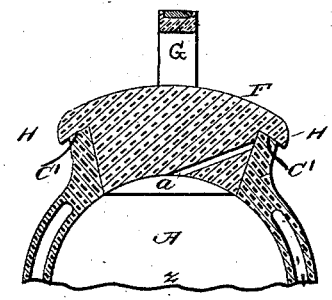

Figure 1 is a view in perspective of my improved jar, and Fig. 2 a diametrical section of the upper part of the same.

The jar or vessel A may be made of any vitreous or other material, preferably of glass. It will be observed by reference to the drawings that the internal side of the upper portion of the jar is a segment of a sphere or a dome struck from the point $z$, and that the mouth flares upwardly and outwardly, terminating in an outwardly-beveled surface C'.

F designates a stopple, which is also made of a vitreous material, preferably of glass, and ground or otherwise fitted into the mouth of the jar, similar to what is technically known as a "salt-mouth stopple," with a handle G, with this exception, that this stopple has an annular flange beveled outwardly and downwardly at H, so as to project beyond and at the same time conform snugly to the beveled edge C' of the mouth of the jar.

It will be observed that the contents of the jar can only come in contact with the glass jar itself and the glass stopple, no rubber, cork, or other packing of any kind being required. Consequently the contents are kept absolutely pure, there being no absorbent material which might come in contact with the milk and contaminate it.

By reference to the drawings it will be observed that when the stopple F is home its concave bottom coincides exactly with and practically forms a circular "keystone" cap for the bottom of the body of the jar. This stopple F is provided with an air-vent $a$, which begins at the top of the concavity of the stopple and terminates at a point just below the flange of the stopple, so that when the jar is filled and the stopple inserted the small amount of air which collects in the concavity of the stopper is forced out through this vent, and when said stopple is home the mouth of the jar acts as a seal for said vent and prevents contact of the outer air with the contents of the jar. By completely filling the jar with milk and forcing the air out through the vent by the insertion of the stopple the contents are practically solid and no chance whatever is afforded for the agitation or churning of the milk. Consequently no obstacle is presented to the rising and settling of the cream on top, even during transportation. By thus completely removing the air from the jar no contact with the external elements is possible, and the milk so hermetically sealed will retain its purity and sweetness for several days, regardless of ordinary changes of temperature.

Having thus fully described my invention, what I claim is—

The combination, with a jar, of a stopple having a concave bottom and provided with an air-vent beginning at the top of said concavity and terminating at a point on its periphery between the flange of said stopple and the top of the concavity, as and for the purpose set forth.

In testimony whereof I affix my signature in presence of two witnesses.

FRANK K. WARD.

Witnesses:
EUGENE M. SANGER,
HENRY J. ENNIS.